(12) United States Patent
Sausen et al.

(10) Patent No.: US 12,038,114 B2
(45) Date of Patent: Jul. 16, 2024

(54) FLUID CONNECTION ASSEMBLY

(71) Applicant: Oetiker NY, Inc., Lancaster, NY (US)

(72) Inventors: Kari Ann Sausen, Clarence, NY (US); Kristian J. Hagen, Gasport, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/246,883

(22) PCT Filed: Jun. 15, 2021

(86) PCT No.: PCT/US2021/037386
§ 371 (c)(1),
(2) Date: Mar. 28, 2023

(87) PCT Pub. No.: WO2022/093331
PCT Pub. Date: May 5, 2022

(65) Prior Publication Data
US 2023/0375115 A1  Nov. 23, 2023

Related U.S. Application Data

(60) Provisional application No. 63/105,449, filed on Oct. 26, 2020.

(51) Int. Cl.
*F16L 37/00* (2006.01)
*F16L 37/12* (2006.01)
*F16L 37/14* (2006.01)

(52) U.S. Cl.
CPC ........... *F16L 37/1225* (2013.01); *F16L 37/14* (2013.01); *F16L 37/148* (2013.01); *F16L 2201/10* (2013.01)

(58) Field of Classification Search
CPC ...... F16L 37/1225; F16L 37/14; F16L 37/148
See application file for complete search history.

(56) References Cited

U.S. PATENT DOCUMENTS

| 2,587,810 A | 8/1947 | Beyer |
| 4,376,525 A | 3/1983 | Fremy |

(Continued)

FOREIGN PATENT DOCUMENTS

| DE | 10029366 A1 * | 12/2001 | ......... B60H 1/00557 |
| DE | 102007025174 A1 * | 4/2008 | .......... F16L 37/1225 |

(Continued)

*Primary Examiner* — Zachary T Dragicevich
*Assistant Examiner* — James A Linford
(74) *Attorney, Agent, or Firm* — Harter Secrest & Emery LLP; Michael Nicholas Vranjes

(57) ABSTRACT

A fluid connection assembly, including a connector body, including a first end, a second end, a first through-bore, a canted coil arranged in the first through-bore, and a first radially outward facing surface including a first groove, and a spacer operatively arranged to be removably connected to the connector body, the spacer including a first section, including a third end engaged with the first groove, a fourth end, a first axial surface arranged between the third end and the fourth end, a first male connector, and a first female connector, and a second section, including a fifth end engaged with the first groove, a sixth end, a second axial surface arranged between the fifth end and the sixth end, a second male connector arranged to engage with the first female connector, and a second female connector arranged to engage with the first male connector.

20 Claims, 10 Drawing Sheets

(56) References Cited

U.S. PATENT DOCUMENTS

| | | | |
|---|---|---|---|
| 4,632,434 A | 12/1986 | Proctor et al. | |
| 4,678,210 A * | 7/1987 | Balsells | F16B 21/18 |
| | | | 285/306 |
| 4,872,710 A * | 10/1989 | Konecny | F16L 37/084 |
| | | | 285/321 |
| 4,906,031 A | 3/1990 | Vyse | |
| 5,082,390 A * | 1/1992 | Balsells | F16L 37/084 |
| | | | 285/318 |
| 5,570,719 A | 11/1996 | Richards et al. | |
| 5,653,475 A * | 8/1997 | Scheyhing | F16L 37/144 |
| | | | 285/379 |
| 5,727,821 A | 3/1998 | Miller | |
| 9,482,255 B2 | 11/2016 | Changsrivong et al. | |
| 9,677,587 B2 | 6/2017 | Changsrivong et al. | |
| 10,221,976 B2 | 3/2019 | Kujawski et al. | |
| 10,288,203 B2 | 5/2019 | Nelson | |
| 10,655,665 B2 | 5/2020 | Balsells | |
| 2003/0094812 A1* | 5/2003 | Balsells | F16L 37/084 |
| | | | 285/318 |
| 2010/0090379 A1* | 4/2010 | Balsells | F16L 37/122 |
| | | | 267/1.5 |
| 2014/0179148 A1 | 6/2014 | Huang | |
| 2019/0063656 A1 | 2/2019 | Kujawski, Jr. | |

FOREIGN PATENT DOCUMENTS

| | | | | |
|---|---|---|---|---|
| EP | 0778437 | | 6/1997 | |
| EP | 2065628 A2 * | | 6/2009 | B60H 1/00571 |

\* cited by examiner

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2021/037386, filed on Jun. 15, 2021, which application claims the benefit under Articles 4 and 8 of the Stockholm Act of the Paris Convention for the Protection of Industrial Property of U.S. Provisional Patent Application No. 63/105,449, filed on Oct. 26, 2020, which applications are hereby incorporated by reference in their entireties.

FIELD

The present disclosure relates to fluid connectors, and more particularly, to a fluid connection assembly utilizing a canted coil retainer and a removable spacer to lock a tube within a connector body and allows for quick assembly without the need for tools.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining means such as a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethrough and engage the tube, which requires extra post-process manufacturing. During the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

Thus, there has been a long-felt need for a fluid connection assembly including a retaining means that allows for ease of disassembly, eliminates the need for post-process machining, and reduces the insertion force required to assemble the fluid connector.

SUMMARY

According to aspects illustrated herein, there is provided a fluid connection assembly, comprising a connector body, including a first end, a second end, a first through-bore, a canted coil arranged in the first through-bore, and a first radially outward facing surface comprising a first groove, and a spacer operatively arranged to be removably connected to the connector body, the spacer including a first section, including a third end engaged with the first groove, a fourth end, a first axial surface arranged between the third end and the fourth end, a first male connector, and a first female connector, and a second section, including a fifth end engaged with the first groove, a sixth end, a second axial surface arranged between the fifth end and the sixth end, a second male connector arranged to engage with the first female connector, and a second female connector arranged to engage with the first male connector, wherein, in a locked state the first axial surface and the second axial surface abut against the second end.

In some embodiments, the first section further comprises a first flange extending radially inward at the third end, the first flange arranged to engage the first groove. In some embodiments, the fluid connection assembly further comprises a tube including a shoulder, wherein in the locked state the shoulder abuts against the spacer. In some embodiments, the tube further comprises a second groove and a third groove spaced apart from the second groove, wherein in the locked state the canted coil is engaged with the second groove. In some embodiments, a depth of the third groove is greater than a depth of the second groove. In some embodiments, the first section comprises a first plurality of teeth, and the second section comprises a second plurality of teeth operatively arranged to engage the first plurality of teeth to lock the second section to the first section. In some embodiments, the first plurality of teeth are arranged on the first male connector and the second plurality of teeth are arranged on the second female connector. In some embodiments, the first male connector comprises a first projection and a first plurality of teeth arranged on the first projection and extending in a first radial direction. In some embodiments, the second female connector comprises a second projection, and a second plurality of teeth arranged on the second projection and extending in a second radial direction, opposite the first radial direction, the second plurality of teeth operatively arranged to engage the first plurality of teeth to lock the second section with the first section. In some embodiments, the second female connector further comprises a third projection spaced apart from the second projection. In some embodiments, a slot is formed between the second projection and the third projection, and the first projection is operatively arranged to engage the slot. In some embodiments, the first section and the second section are hingedly connected on a first end, and removably connect at a second end. In some embodiments, the first section and the second section are connected via a living hinge.

According to aspects illustrated herein, there is provided a fluid connection assembly, comprising a connector body, including a first end, a second end, a first through-bore, a canted coil arranged in the first through-bore, and a first radially outward facing surface comprising a first groove, and a spacer operatively arranged to be removably connected to the connector body, the spacer including a first section, including a third end engaged with the first groove, a fourth end, a first axial surface arranged between the third end and the fourth end, a male connector comprising a first plurality of teeth extending in a first radial direction, and a second section, including a fifth end engaged with the first groove, a sixth end, a second axial surface arranged between the fifth end and the sixth end, and a female connector comprising a second plurality of teeth extending in a second radial direction, opposite the first radial direction, the second plurality of teeth operatively arranged to engage the first plurality of teeth.

In some embodiments, the first section further comprises at least one flange extending radially inward at the third end, the at least one flange arranged to engage the first groove. In some embodiments, the fluid connection assembly further comprises a tube including a shoulder, a second groove, and a third groove spaced apart from the second groove, wherein in the locked state the shoulder abuts against the spacer and the canted coil is engaged with the second groove. In some embodiments, the first section comprises a first radially inward facing surface including a first diameter and forming the third end, a second radially inward facing surface including a second diameter and forming the fourth end, the second diameter being less than the first diameter. In some embodiments, the male connector comprises a first projection, and the first plurality of teeth are arranged on the first projection. In some embodiments, the female connector comprises a second projection, and the second plurality of teeth are arranged on the second projection, wherein engagement of the second plurality of teeth with the first plurality of teeth lock the second section to the first section. In some embodiments, the female connector further comprises a third projection spaced apart from the second projection. In some embodiments, a slot is formed between the second projection and the third projection, and the first projection is operatively arranged to engage the slot.

According to aspects illustrated herein, there is provided a fluid connection assembly, comprising a connector body, including a first end, a second end, a through-bore, a canted coil arranged in the through-bore, and a radially outward facing surface comprising a first groove, a spacer operatively arranged to be removably connected to the connector body, the spacer including a first section, including a third end engaged with the first groove, a fourth end, a first axial surface arranged between the third end and the fourth end, a male connector comprising a first plurality of teeth extending in a first radial direction, and a second section, including a fifth end engaged with the first groove, a sixth end, a second axial surface arranged between the fifth end and the sixth end, and a female connector comprising a second plurality of teeth extending in a second radial direction, opposite the first radial direction, the second plurality of teeth operatively arranged to engage the first plurality of teeth, and a tube including a shoulder, a second groove, and a third groove spaced apart from the second groove, wherein in the locked state the shoulder abuts against the spacer and the canted coil is engaged with the second groove.

The present disclosure provides a fluid connection assembly comprising a spacer or standoff or dimensional standoff, connector body, spacer coil, and tube or tube end form. In some embodiments, the spacer may comprise two sections operatively arranged to removably connect to each other. In some embodiments, the spacer may comprise two sections operatively arranged to removably connect to each other when attached to the connector body. In some embodiments, each of the two sections are identical. In some embodiments, the spacer comprises two sections hingedly connected via a living hinge. When a shoulder or flare of the tube is mated to the top surface of the spacer, the tube is fully inserted. This provides the visual indication that the fluid connection assembly is fully assembled. It serves to simplify the installation and also reduces the number of manufacturing processes required to manufacture the connector body. It eliminates the need for slots in the connector body which improves the cleanliness aspect of manufacturing the connector body.

The fluid connection assembly of the present disclosure provides for a simple installation with a low insertion force during assembly of the tube within the connector body. When the tube needs to be serviced, the spacer is removed. The tube shoulder is pushed to bottom out on the top (or end) of the connector body. This operation inserts the tube into the connector body a set distance to unlock the tube for removal and serviceability. The tube is then pulled out very easily. This solution requires specific standoff and tube end form geometry for visual indication of correct insertion and for quick release of the tube. In addition, the tube may comprise a tapered and/or reduced diameter nose to reduce required insertion forces even further.

In some embodiments, the spacer is removably connected to the connector body. The tube is then inserted into the spacer and the connector body until the shoulder abuts against the spacer. The tube is now in a locked position. When the spacer is removed for service, the tube is inserted further into the connector body until the shoulder abuts against an end of the connector body, at which point the spacer, or canted coil spring, releases the tube from its locked state. The tube may then be easily removed from the connector body.

The present disclosure provides a fluid connection assembly that provides visual indication of connection, improved cleanliness, a reduced insertion force, and easier serviceability. The fluid connection assembly of the present disclosure minimizes axial endplay.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
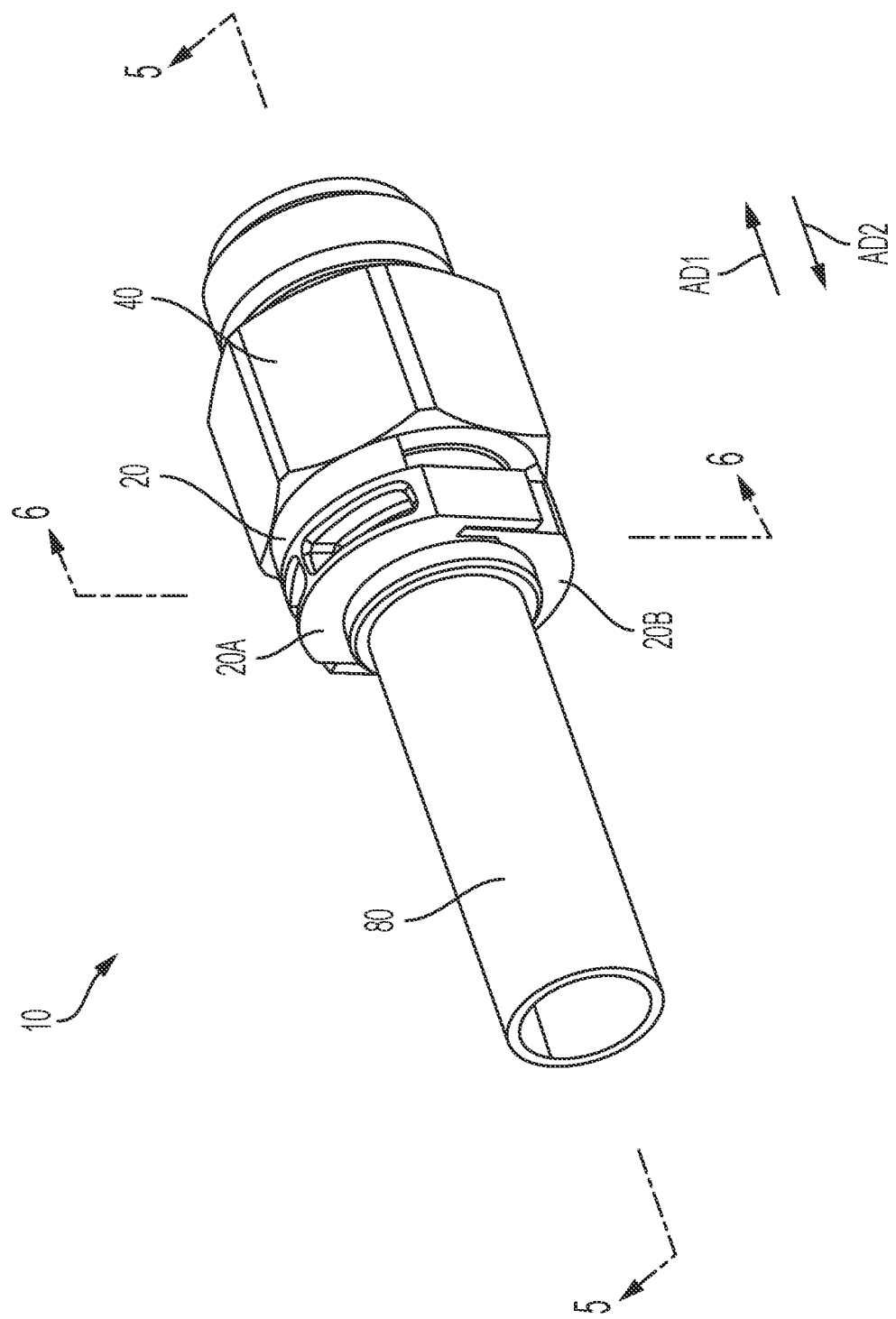
FIG. 1 is a perspective view of a fluid connection assembly, in a locked state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
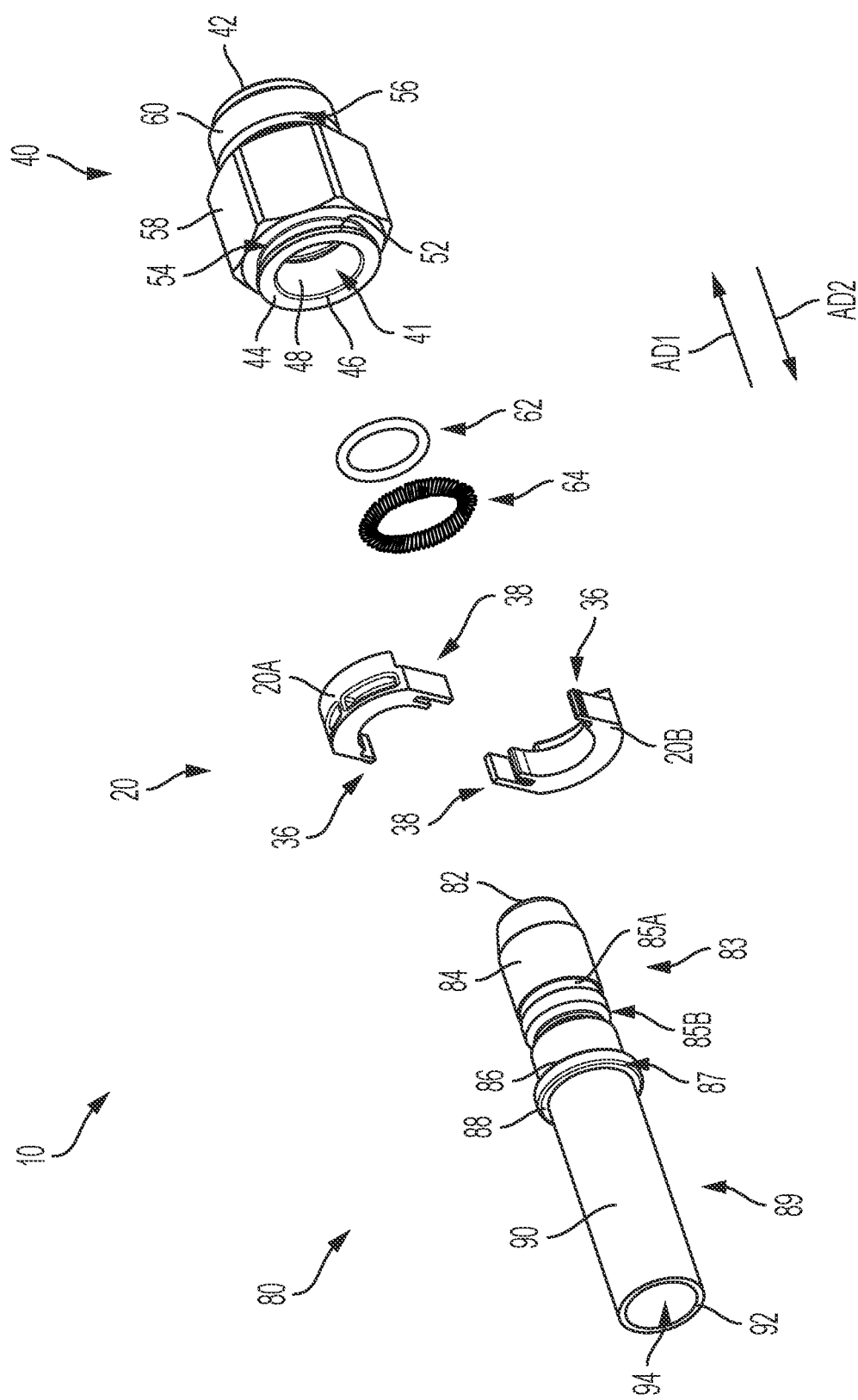
FIG. 2 is an exploded perspective view of the fluid connection assembly shown in FIG. 1.

Adverting now to the figures, FIG. 1 is a perspective view of fluid connection assembly 10, in a locked state. FIG. 2 is an exploded perspective view of fluid connection assembly 10. Fluid connection assembly 10 generally comprises spacer 20, tube 80, and connector body 40. The following description should be read in view of FIGS. 1-2.

Tube 80 comprises end 82, section 83, bead or shoulder 87, section 89, end 92, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 5). Radially outward facing surface 84 comprises one or more grooves, for example, groove 85A and 85B.

Groove 85A is shallower than groove 85B (i.e., groove 85A comprises a first depth and groove 85B comprises a second depth, the second depth being greater than the first depth). Groove 85A comprises a bottom surface and two side surfaces that extend from radially outward facing surface 84. In some embodiments, the bottom surface is substantially parallel to radially outward facing surface 84. In some embodiments, the bottom surface is non-parallel to radially outward facing surface 84. In some embodiments, the two side surfaces are substantially perpendicular to radially outward facing surface 84. In some embodiments, the two side surfaces are tapered and are non-perpendicular to radially outward facing surface 84. Groove 85A is operatively arranged to engage canted coil 64 in order to lock fluid connection assembly 10 (i.e., in the locked state), as will be described in greater detail below.

Figure 5:
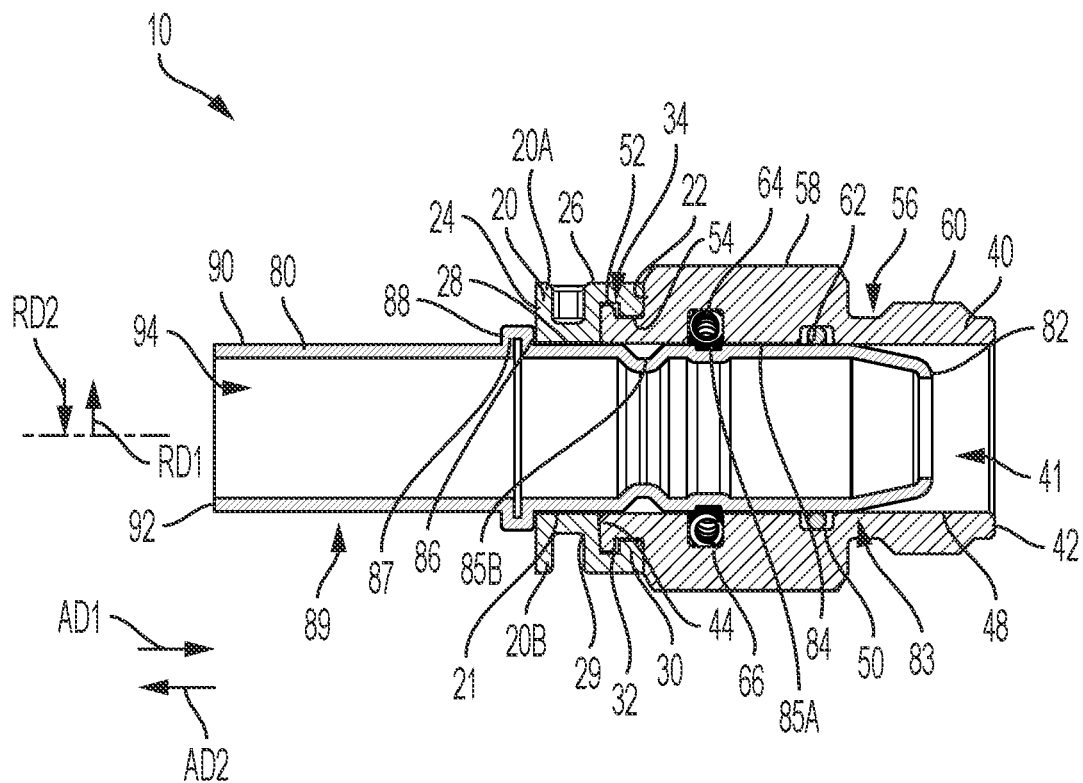
FIG. 5 is a cross-sectional view of the fluid connection assembly taken generally along line 5-5 in FIG. 1.

Groove 85B is axially spaced from groove 85A in axial direction AD2 (i.e., groove 85B is arranged between groove 85A and shoulder 87). Groove 85B comprises a bottom surface and two side surfaces that extend from radially outward facing surface 84. In some embodiments, the bottom surface is substantially parallel to radially outward facing surface 84. In some embodiments, the bottom surface is non-parallel to radially outward facing surface 84. In some embodiments, the two side surfaces are tapered and are non-perpendicular to radially outward facing surface 84. As best shown in FIG. 5, the two side surfaces are tapered away from each other in radial direction RD1. In some embodiments, the two side surfaces are substantially perpendicular to radially outward facing surface 84. Groove 85B is operatively arranged to engage canted coil 64 in order to unlock fluid connection assembly 10, as will be described in greater detail below.

Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increases in diameter in axial direction AD2. In some embodiments, surface 86 may comprise a linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 40. Tube 80 is inserted into connector body 40 until shoulder 87, specifically surface 86, engages spacer 20, specifically end 24 (see FIG. 5). When surface 86 abuts against end 24, section 83, or radially outward facing surface 84, engages seal 62 and canted coil 64 engages groove 85A. This is the locked state of fluid connection assembly 10 wherein tube 80 cannot be displaced in axial direction AD1 with respect to connector body 40 (due to the engagement of spacer 20 with shoulder 87) or in axial direction AD2 with respect to connector body 40 (due to the engagement of canted coil 64 with groove 85A). Shoulder 87 is arranged outside of and axially spaced from connector body 40. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal. In some embodiments, tube 80 comprises a polymer. In some embodiments, tube 80 comprises a ceramic.

Figure 3:
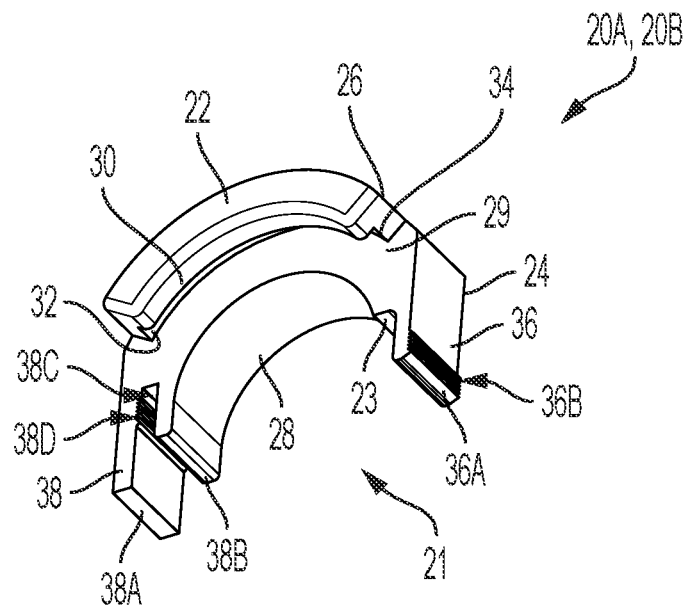
FIG. 3 is a perspective view of a section of the spacer shown in FIG. 1.
Figure 4:
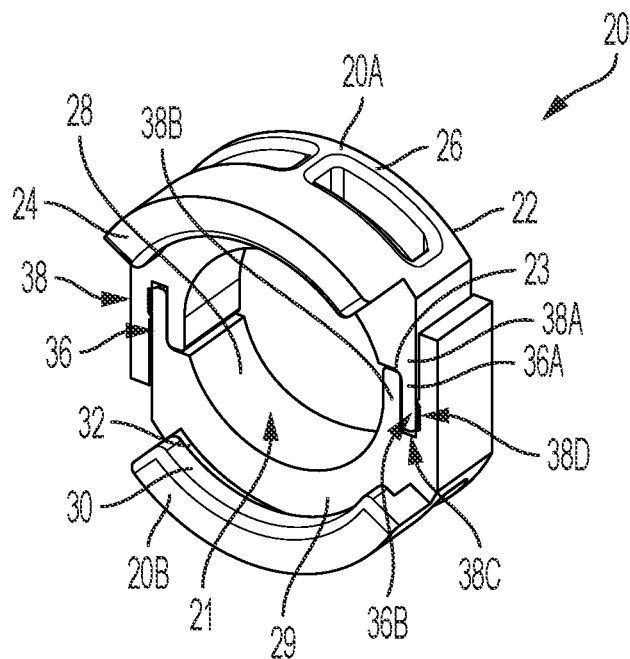
FIG. 4 is a perspective view of the spacer shown in FIG. 1.
Figure 6:
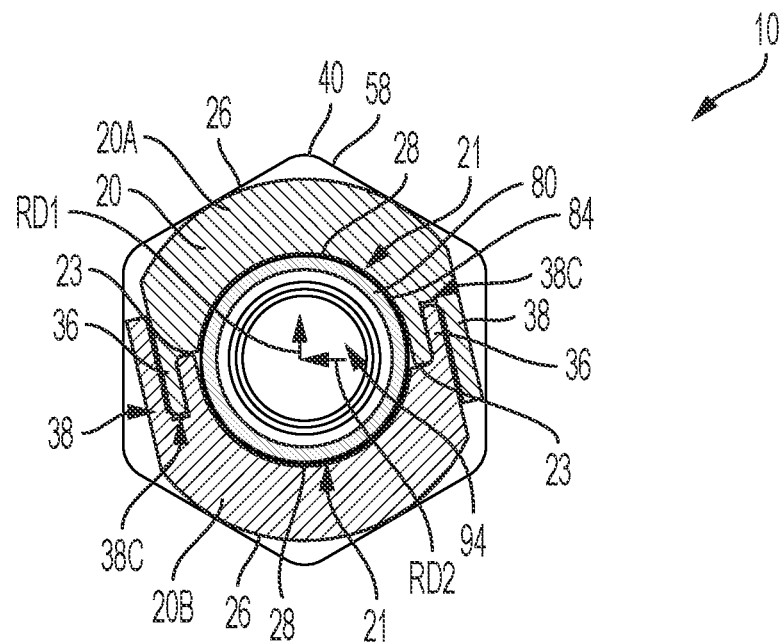
FIG. 6 is a cross-sectional view of the fluid connection assembly taken generally along line 6-6 in FIG. 1.

FIG. 3 is a perspective view of section 20A, 20B of spacer 20. FIG. 4 is a perspective view of spacer 20. FIG. 5 is a cross-sectional view of fluid connection assembly 10 taken generally along line 5-5 in FIG. 1. FIG. 6 is a cross-sectional view of the fluid connection assembly taken generally along line 6-6 in FIG. 1. The following description should be read in view of FIGS. 1-6.

Spacer 20 generally comprises section 20A and section 20B. In some embodiments, and as shown, section 20A and section 20B are substantially the same. Section 20A, 20B generally comprises end 22, end 24, radial surface 23 extending from end 22 and end 24, hole 21 extending from end 22 to end 24, radially outward facing surface 26, radially inward facing surface 28, and radially inward facing surface 32. Radially inward facing surface 28 extends from end 24 to axial surface 29 and comprises a first diameter. Radially inward facing surface 28 is operatively arranged to engage tube 80, specifically, radially outward facing surface 84 proximate or immediately adjacent to shoulder 87. Radially inward facing surface 32 extends from end 22 to axial surface 29 and comprises a second diameter, the second diameter being greater than the first diameter (of radially inward facing surface 28). Radially inward facing surface 32 comprises flange 30 extending radially inward therefrom. Flange 30 is arranged adjacent to end 22 and comprises a third diameter, the third diameter being greater than the first diameter (of radially inward facing surface 28) and less than the second diameter (of radially inward facing surface 32). Groove 34 is formed by flange 30, radially inward facing surface 32, and surface 29. Flange 30 is operatively arranged to engage groove 54 and radially inward facing surface 32 is operatively arranged to engage radially outward facing surface 52 (i.e., groove 34 engages end 44 of connector body 40) to connect spacer 20 to connector body 40. Radially inward facing surface 32 is connected to radially inward facing surface 28 via axial surface 29 which is arranged to abut against end 44 when spacer 20 is fully connected to connector body 40 (see FIG. 5). Surface 29 separates groove 34 and radially inward facing surface 28.

Section 20A, 20B further comprises male connector 36 and female connector 38. As shown, male connector 36 on section 20A is arranged to engage female connector 38 on section 20B, and male connector 36 on section 20B is arranged to engage female connector 38 on section 20A such that sections 20A and 20B are fixedly secured. In some embodiments, male connector 36 comprises radially extending projection 36A. Projection 36A extends generally radially inward in radial direction RD2. In some embodiments, male connector 36, specifically projection 36A, extends from radial surface 23 and is arranged parallel to a tangential surface of radially inward facing surface 28 (i.e., parallel to projection 38B). Male connector 36 further comprises a plurality of teeth 36B. In some embodiments, teeth 36B extend radially outward in radial direction RD1 from projection 36A. In some embodiments, teeth 36B extend radially inward in radial direction RD2 from projection 36A. In some embodiments, projection 36A is flexible, elastic, or semi-elastic to allow male connector 36 and female connector 38 to be disengaged, as will be described in greater detail below.

In some embodiments, female connector 38 comprises projection 38A and projection 38B. Projection 38B extends from surface 23 and is arranged tangent to radially inward facing surface 28. In some embodiments, projection 38B is not arranged tangent to radially inward facing surface 28. Projection 38A is arranged parallel to and spaced apart from protrusion 38B, forming slot or space 38C radially therebetween. In some embodiments, projection 38A is arranged non-parallel to projection 38B. Female connector 38 further comprises a plurality of teeth 38D arranged within slot 38C. In some embodiments, teeth 38D extend radially inward in radial direction RD2 from projection 38A and are operatively arranged to engage teeth 36B to lock sections 20A and 20B together. In some embodiments, teeth 38D extend radially outward in radial direction RD1 from projection 38B. In some embodiments, teeth 38D are arranged outside of slot 38C. In some embodiments, projection 38A and/or projection 38B are flexible, elastic, or semi-elastic to allow male connector 36 and female connector 38 to be disengaged, as will be described in greater detail below.

To connect section 20A and section 20B, male connector 36 is displaced toward female connector 38. As male connector 36 engages female connector 38, teeth 36B engage teeth 38D. The user may engage as many of teeth 36B and 38D as is necessary to connect spacer 20 to connector body 40. This feature, namely, the ratchet teeth of male connector 36 and female connector 38, allows spacer 20 to be adjustable depending on the size of connector body 40 and tube 80 (i.e., diameters). Thus, for example, for a connector body 40 having a larger overall outer diameter, only one or two of teeth 36B and 38D are engaged. For a connector body 40 having a smaller overall diameter, more of teeth 36B and 38D will be engaged. When section 20A is secured to section 20B, projection 36A is engaged with slot 38C and projection 38B is arranged proximate to or abuts against surface 23. To disconnect section 20A and section 20B, at least one of projection 36A and projection 38B is displaced to disengage teeth 36B and teeth 38D. For example, projection 38A is displaced radially outward in radial direction RD1, which disengages teeth 38D from teeth 36B. In some embodiments, a tool such as a flat head screwdriver can be used to displace projection 38A and disconnect sections 20A and 20B.

Connector body 40 comprises through-bore 41 extending from end 42 to end 44, radially inward facing surface 46, radially inward facing surface 48, groove 50, groove 66, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed into is a condenser, evaporator, or pump. It should be appreciated that fluid connector 10 may be used in various other components, assemblies, and subassemblies in which fluid connection is desired.

Radially outward facing surface 60 may further comprise groove 56. A seal or O-ring is arranged in groove 56 to create a fluid tight seal between connector body 40 and the component it is connected to. Seal 62 is arranged in connector body 40. Specifically, seal 62 is arranged in groove 50. Groove 50 is arranged in radially inward facing surface 48. In some embodiments, seal 62 is an O-ring. Canted coil 64 is arranged in connector body 40. Specifically, canted coil 64 is arranged in groove 66. Groove 66 is arranged in radially inward facing surface 48. In some embodiments, and as shown, radially inward facing surface 46 is a frusto-conical surface that connects generally cylindrical radially inward facing surface 48 with end 44 (e.g., a chamfered surface). Groove 54 is arranged in radially outward facing surface 52. Groove 54 is arranged axially between end 44 and head 58. In some embodiments, groove 54 is arranged immediately adjacent to head 58. Groove 54 is operatively arranged to engage with flange 30 to connect spacer 20 to connector body 40. In some embodiments, connector body 40 comprises a metal. In some embodiments, connector body 40 comprises a polymer. In some embodiments, connector body 40 comprises a ceramic.

To assemble fluid connection assembly 10, spacer 20 is secured over or onto connector body 40. Specifically, section 20A is arranged over connector body 40 such that flange 30 engages groove 54, radially inward facing surface 32 engages radially outward facing surface 52, and surface 29 engages end 24. Once section 20A is properly positioned, section 20B is positioned in the same way and is "snapped" into section 20B. By snapped it is meant that male connector 36 of section 20B is engaged with female connector 38 of section 20A, and female connector 38 of section 20B is engaged with male connector 36 of section 20A, or vice versa. This can be done sequentially or simultaneously. This connection method creates a snapping or ratcheting effect between teeth 36B and teeth 38D that ultimately axially secures retainer 20 to connector body 40. Tube 80 is then inserted in axial direction AD1, with end 82 first, into and spacer 20 and connector body 40. Radially outward facing surface 84 engages seal 62 and section 83 is arranged inside of connector body 40 proximate radially inward facing surface 48. Shoulder 87 is spaced apart from end 44 such that surface 86 abuts against end 24 and canted coil 64 is engaged with groove 85A. As tube 80 is inserted in axial direction AD1 within connector body 40, radially outward facing surface 84 engages canted coil 64 thereby "charging" or rotating it about a center axis of the coil. When groove 85A finally aligns with groove 66, canted coil 64 is charged or exhibits a wound state and is ovular such that canted coil 64 prevents tube 80 from being displaced in axial direction AD2 with respect to connector body 40. While the now charged canted coil 64 prevents displacement of tube 80 in axial direction AD2 with respect to connector body 40, spacer 20 prevents displacement of tube 80 in axial direction AD1 with respect to connector body 40 and fluid connection assembly 10 is in the locked state. In addition, in the locked state radially inward facing surface 28 engages tube 80, specifically radially outward facing surface 84, which further prevents displacement of tube 80 in radial directions RD1 and RD2 relative to connector body 40.

To disengage or unlock fluid connection assembly 10, spacer 20 is first removed from connector body 40. As previously described, female connector 38 is disengaged from male connector 36, for example, by displacing projection 38A radially outward in radial direction RD1 relative to projection 36A, which disengages teeth 38D from teeth 36B. Sections 20A and 20B can then be separated. Tube 80 is then displaced in axial direction AD1 with respect to connector body 40 until surface 86 engages or abuts against end 44 of connector body 40. At this point, groove 85B is aligned with groove 66 and engaged with canted coil 64. Because groove 85B comprises a greater depth than groove 85A, groove 85B, when aligned with groove 66, allows canted coil 64 to unwind or un-charge (i.e., release its tension). Once the tension in canted coil 64 is released, tube 80 can then be removed from connector body 40 (i.e., displaced in axial direction AD2 with respect to connector body 40).

Figure 7:
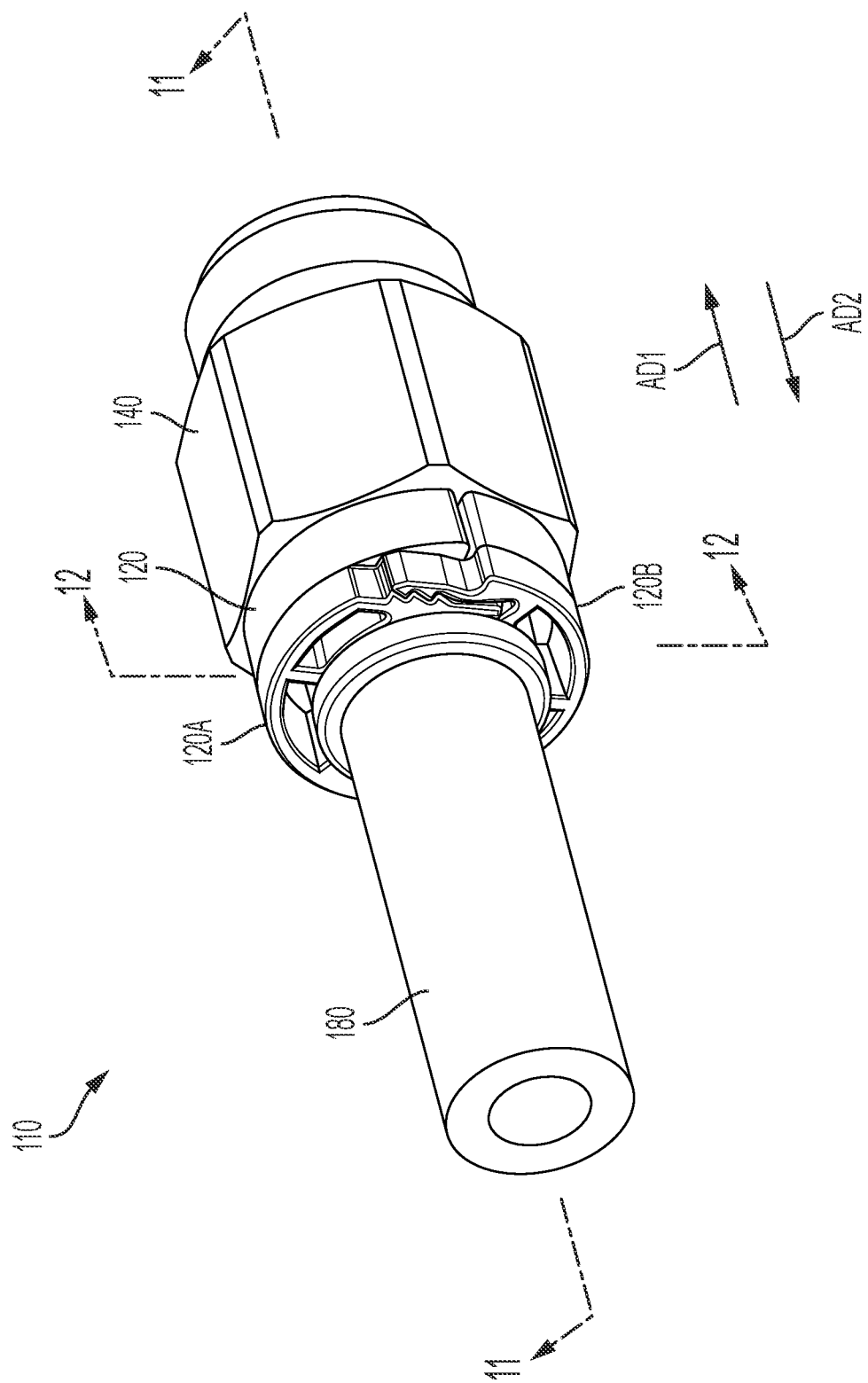
FIG. 7 is a perspective view of a fluid connection assembly, in a locked state.
Figure 8:
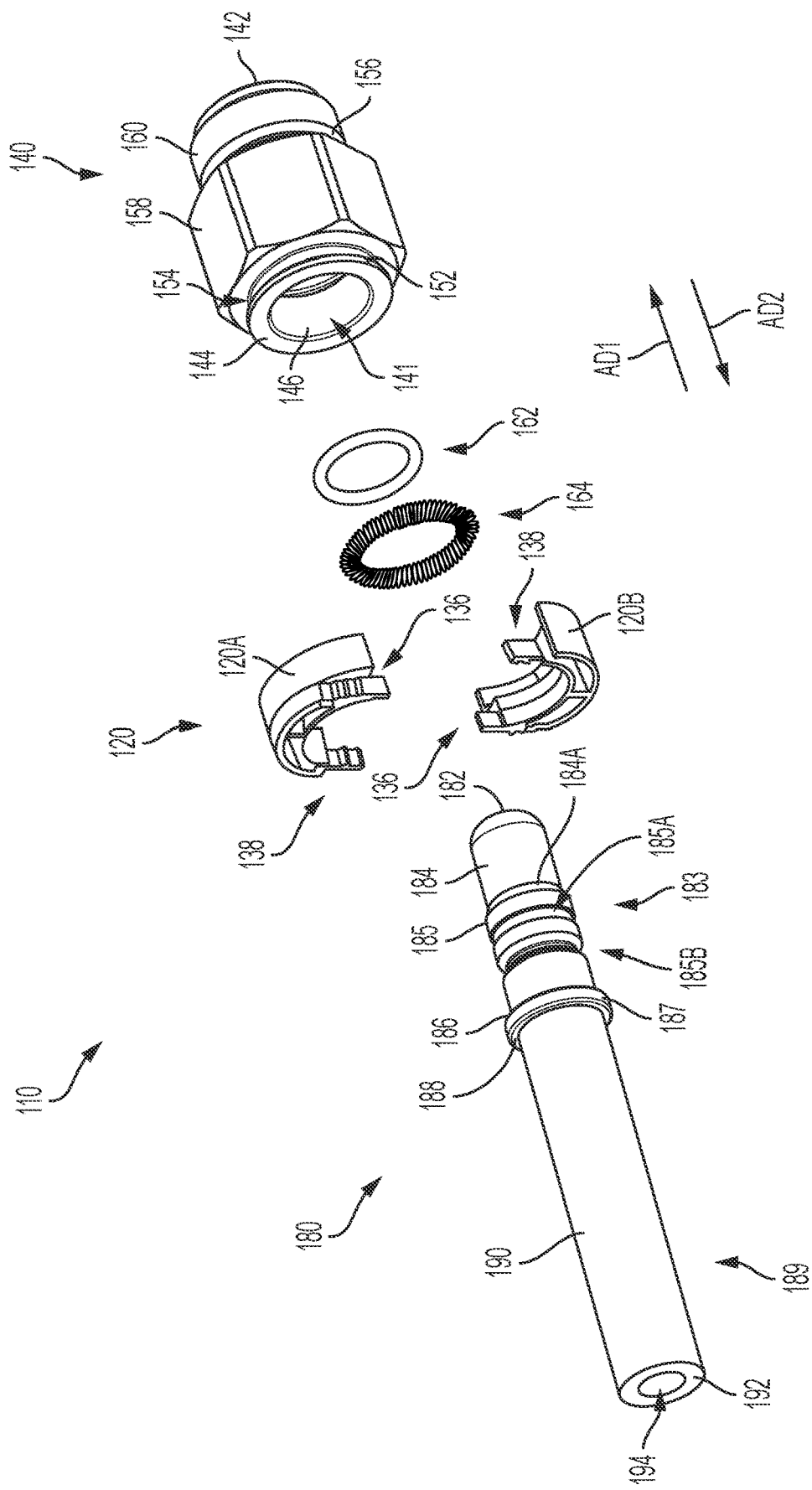
FIG. 8 is an exploded perspective view of the fluid connection assembly shown in FIG. 7.

FIG. 7 is a perspective view of fluid connection assembly 110, in a locked state. FIG. 8 is an exploded perspective view of fluid connection assembly 110. Fluid connection assembly 110 generally comprises spacer 120, tube 180, and connector body 140. The following description should be read in view of FIGS. 7-8.

Tube 180 comprises end 182, section 183, bead or shoulder 187, section 189, end 192, and through-bore 194. Through-bore 194 extends through tube 180 from end 182 to end 192. Section 183 is arranged between end 182 and shoulder 187 and comprises radially outward facing surface 184 and radially outward facing surface 185. Radially outward facing surface 184 includes a substantially constant diameter. In some embodiments, radially outward facing surface 184 comprises a frusto-conical taper or curvilinear surface proximate end 182 (see FIG. 11). Radially outward facing surface 185 is arranged between radially outward facing surface 184 and shoulder 187 and comprises one or more grooves, for example, groove 185A and groove 185B. Radially outward facing surface 184 comprises a diameter that is less than the diameter of radially outward facing surface 185. The reduced diameter of radially outward facing surface 184 prevents engagement of canted coil 164 with radially outward facing surface 184. Such engagement can create scratches on radially outward facing surface 184, which is detrimental to the seal created with seal 162. Thus, as will be described in greater detail below, it is radially outward facing surface 185, and not radially outward facing surface 184, that charges canted coil 164. In some embodiments, section 183 further comprises radially outward facing surface 184A. Radially outward facing surface 184A is a frusto-conical surface that connects radially outward facing surface 184 with radially outward facing surface 185. In some embodiments, surface 184A is an axial surface facing in axial direction AD1.

Groove 185A is shallower than groove 185B (i.e., groove 185A comprises a first depth and groove 185B comprises a second depth, the second depth being greater than the first depth). Groove 185A comprises a bottom surface and two side surfaces that extend from radially outward facing surface 185. In some embodiments, the bottom surface is substantially parallel to radially outward facing surface 185. In some embodiments, the bottom surface is non-parallel to radially outward facing surface 185. In some embodiments, the two side surfaces are substantially perpendicular to radially outward facing surface 185. In some embodiments, the two side surfaces are tapered and are non-perpendicular to radially outward facing surface 185. Groove 185A is operatively arranged to engage canted coil 164 in order to lock fluid connection assembly 110 (i.e., in the locked state), as will be described in greater detail below.

Figure 11:
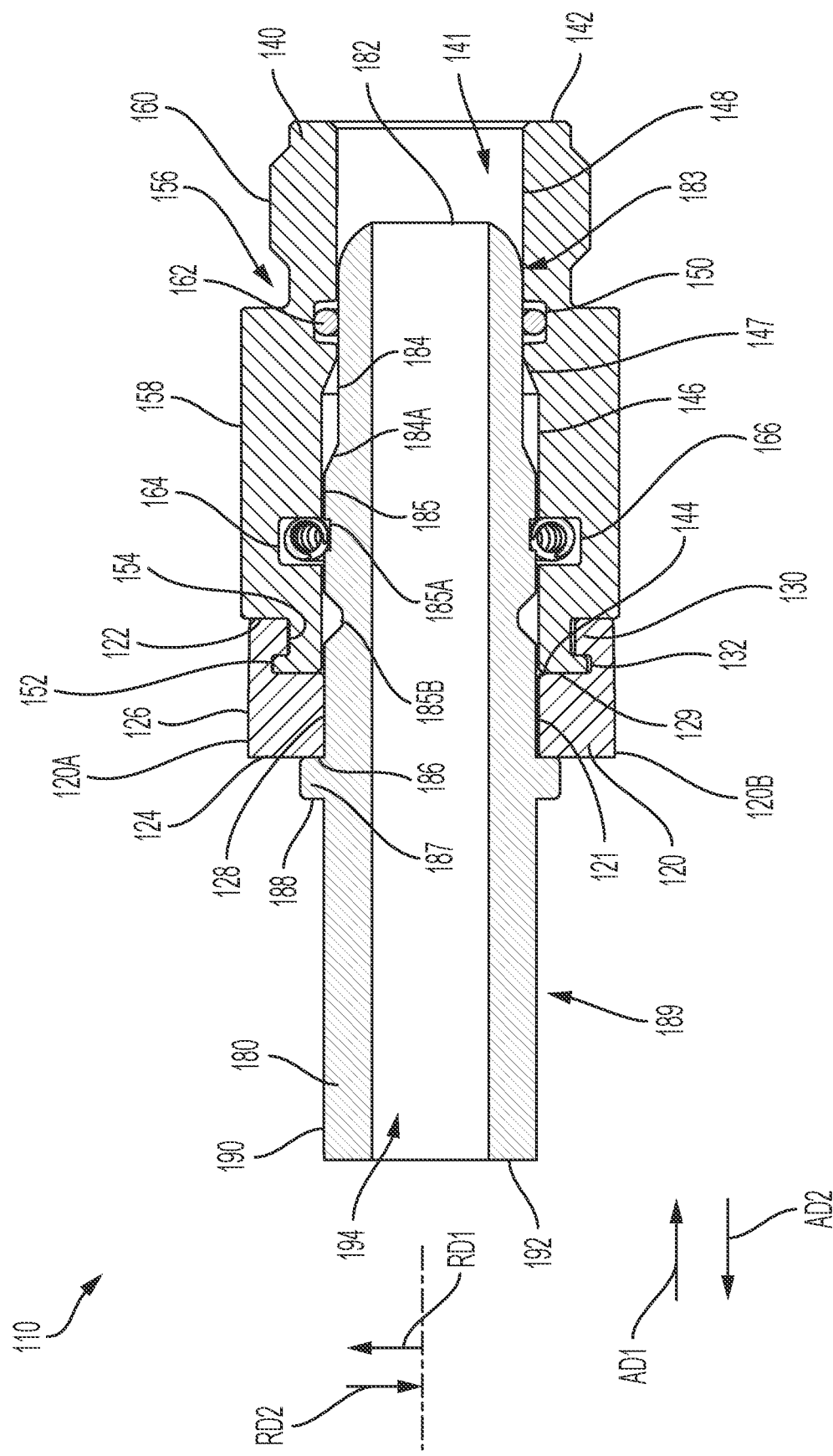
FIG. 11 is a cross-sectional view of the fluid connection assembly taken generally along line 11-11 in FIG. 7; and, FIG. 12 is a cross-sectional view of the fluid connection assembly taken generally along line 12-12 in FIG. 7.

Groove 185B is axially spaced from groove 185A in axial direction AD2 (i.e., groove 185B is arranged between groove 185A and shoulder 187). Groove 185B comprises a bottom surface and two side surfaces that extend from radially outward facing surface 185. In some embodiments, the bottom surface is substantially parallel to radially outward facing surface 185. In some embodiments, the bottom surface is non-parallel to radially outward facing surface 185. In some embodiments, the two side surfaces are tapered and are non-perpendicular to radially outward facing surface 185. As best shown in FIG. 11, the two side surfaces are tapered away from each other in radial direction RD1. In some embodiments, the two side surfaces are substantially perpendicular to radially outward facing surface 185. Groove 185B is operatively arranged to engage canted coil 164 in order to unlock fluid connection assembly 110, as will be described in greater detail below.

Shoulder 187 is arranged between section 183 and section 189 and comprises surface 186 and surface 188. In some embodiments, surface 186 is an axial surface facing at least partially in axial direction AD1 and surface 188 is an axial surface facing at least partially in axial direction AD2. In some embodiments, surface 186 is a frusto-conical surface extending from the radially outward facing surface of shoulder 187 radially inward in axial direction AD1. For example, surface 186 may be a linear conical shape and increases in diameter in axial direction AD2. In some embodiments, surface 186 may comprise a linear portion and a conical or frusto-conical portion. Section 189 is arranged between shoulder 187 and end 192 and comprises radially outward facing surface 190. Radially outward facing surface 190 includes a substantially constant diameter.

Tube 180 is arranged to be inserted, specifically with end 182 first, into connector body 140. Tube 80 is inserted into connector body 140 until shoulder 187, specifically surface 186, engages spacer 120, specifically end 124 (see FIG. 11). When surface 186 abuts against end 124, section 183, or radially outward facing surface 184, engages seal 162 and canted coil 164 engages groove 185A. This is the locked state of fluid connection assembly 110 wherein tube 180 cannot be displaced in axial direction AD1 with respect to connector body 140 (due to the engagement of spacer 120 with shoulder 187) or in axial direction AD2 with respect to connector body 140 (due to the engagement of canted coil 164 with groove 185A). Shoulder 187 is arranged outside of and axially spaced from connector body 140. It should be appreciated that tube 180 may be any traditional tube or tube end form comprising a bead, radially outward extending protrusion or flange, or ramp profile, which extends radially outward and axially on the outer surface of the tube, to secure the tube within the connector body. In some embodiments, tube 180 comprises a metal. In some embodiments, tube 180 comprises a polymer. In some embodiments, tube 180 comprises a ceramic.

Figure 9A:
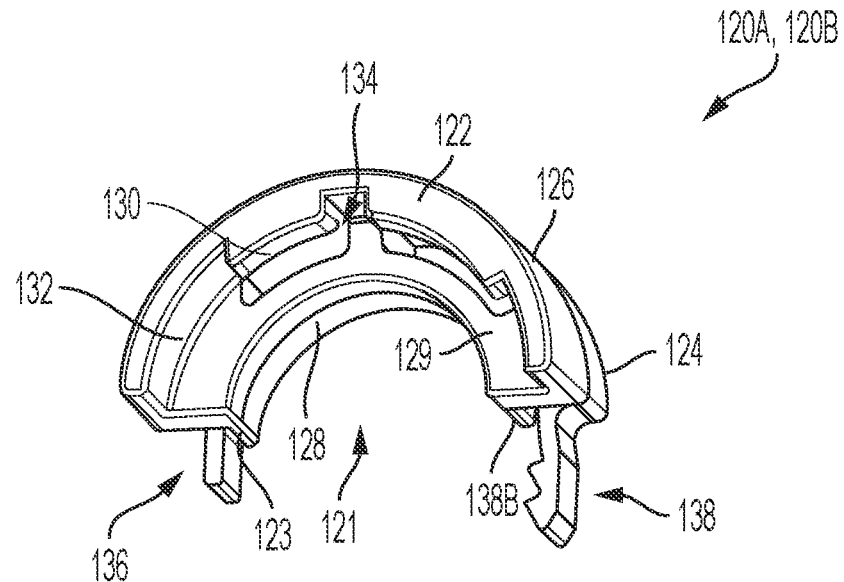
FIG. 9A is a front perspective view of a section of the spacer shown in FIG. 7.
Figure 9B:
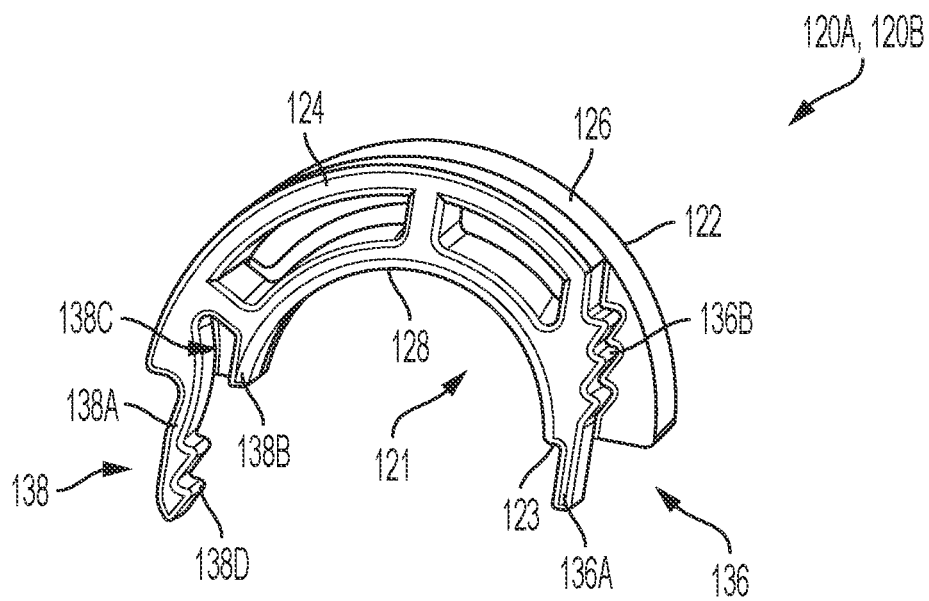
FIG. 9B is a rear perspective view of the section of the spacer shown in FIG. 7.
Figure 10A:
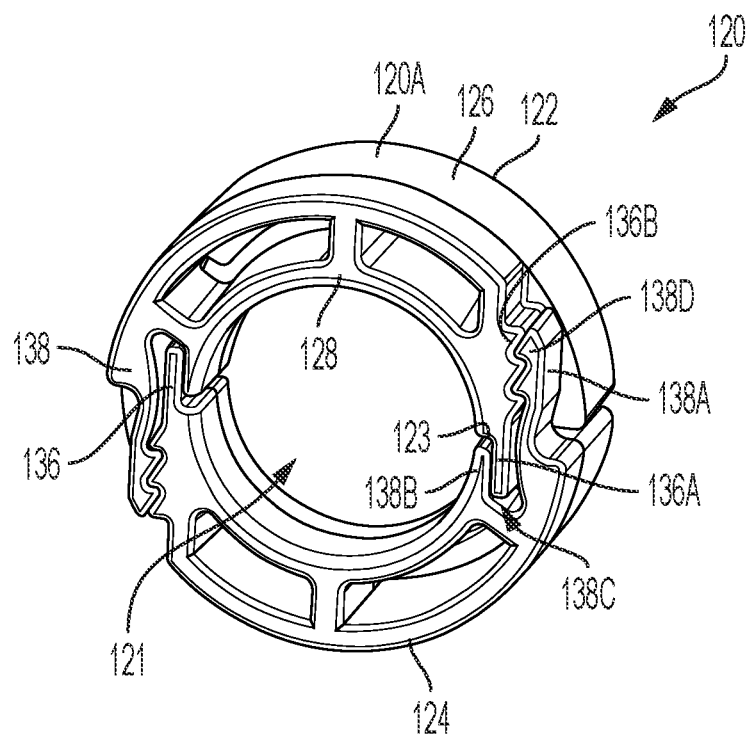
FIG. 10A is a rear perspective view of the spacer shown in FIG. 7.
Figure 10B:
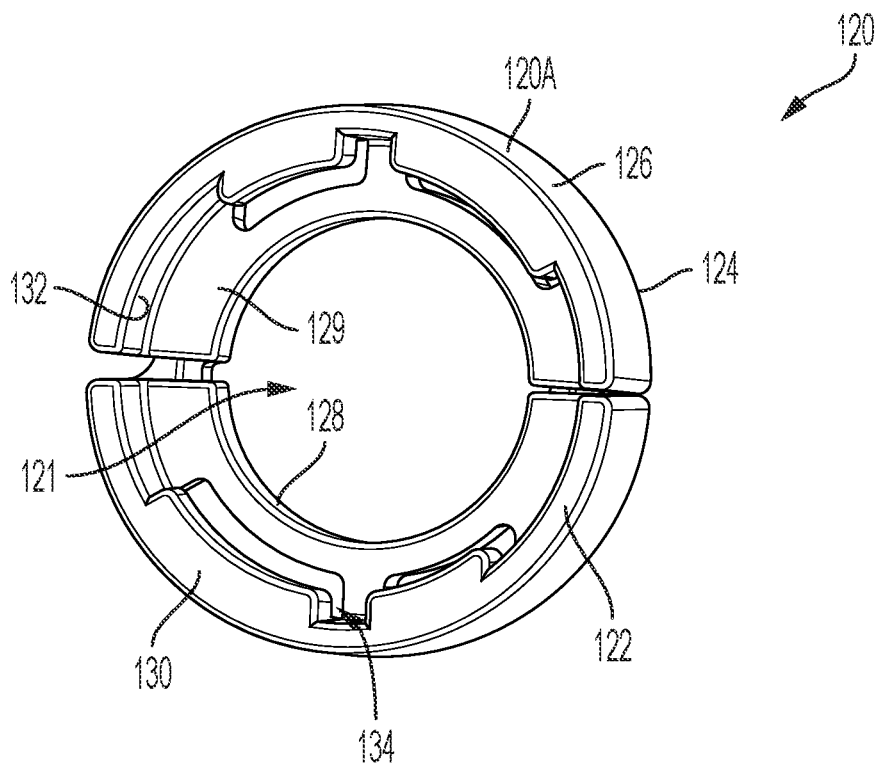
FIG. 10B is a front perspective view of the spacer shown in FIG. 7.
Figure 12:
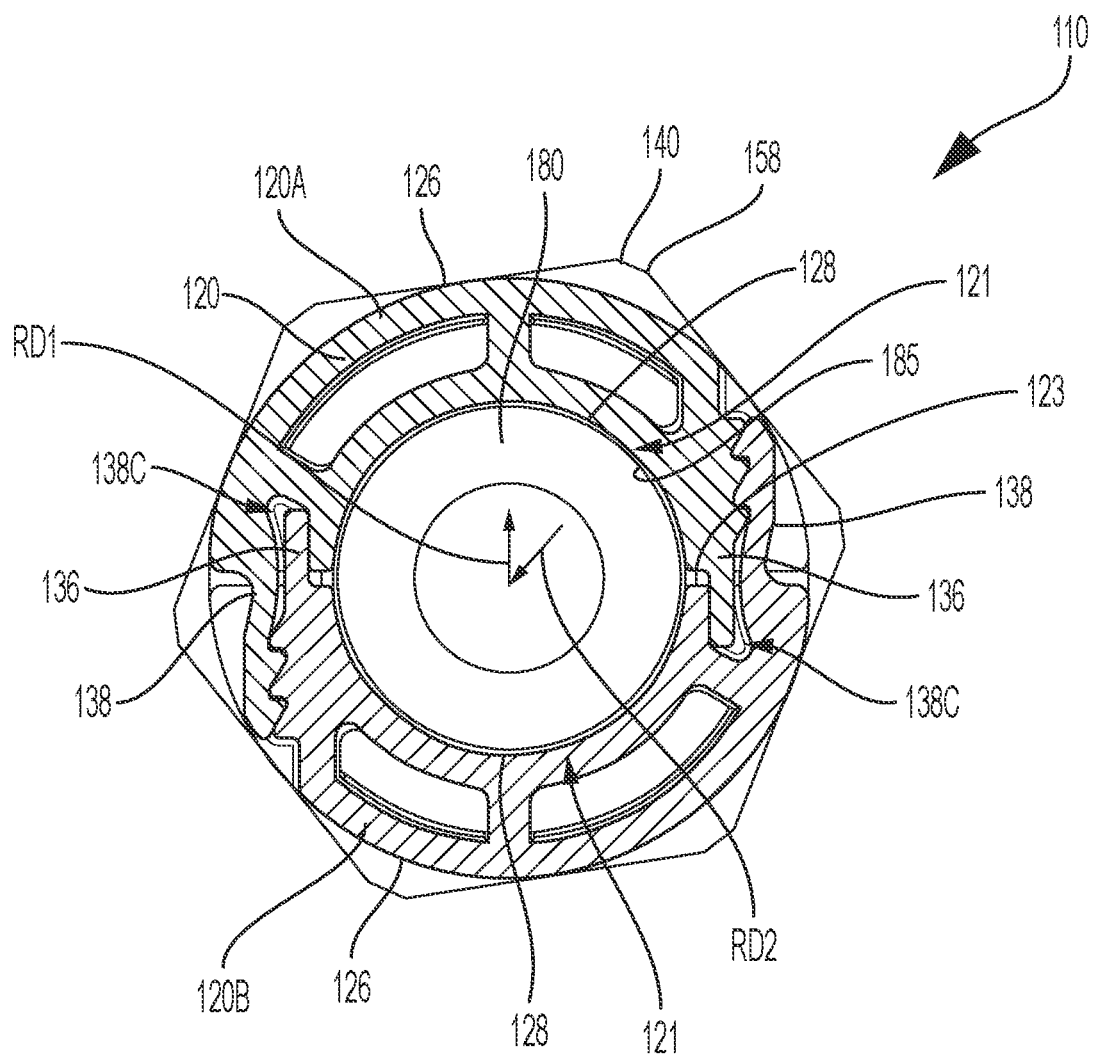

FIG. 9A is a front perspective view of section 120A, 120B of spacer 120. FIG. 9B is a rear perspective view of section 120A, 120B of spacer 120. FIG. 10A is a rear perspective view of spacer 120. FIG. 10B is front perspective view of spacer 120. FIG. 11 is a cross-sectional view of fluid connection assembly 110 taken generally along line 11-11 in FIG. 7. FIG. 12 is a cross-sectional view of fluid connection assembly 110 taken generally along line 12-12 in FIG. 7. The following description should be read in view of FIGS. 7-12.

Spacer 120 generally comprises section 120A and section 120B. In some embodiments, and as shown, section 120A and section 120B are substantially the same. Section 120A, 120B generally comprises end 122, end 124, radial surface 123, hole 121 extending from end 122 to end 124, radially outward facing surface 126, radially inward facing surface 128, and radially inward facing surface 132. Radially inward facing surface 128 extends from end 124 to axial surface 129 and comprises a first diameter. Radially inward facing surface 128 is operatively arranged to engage tube 180, specifically, radially outward facing surface 184 proximate or immediately adjacent to shoulder 187. Radially inward facing surface 132 extends from end 122 to axial surface 129 and comprises a second diameter, the second diameter being greater than the first diameter (of radially inward facing surface 128). Radially inward facing surface 132 comprises one or more flanges 130 extending radially inward therefrom. Flanges 130 are arranged adjacent to end 122 and comprises a third diameter, the third diameter being greater than the first diameter (of radially inward facing surface 128) and less than the second diameter (of radially inward facing surface 132). Groove 134 is formed by flange 130, radially inward facing surface 132, and surface 129. Flange 130 is operatively arranged to engage groove 154 and radially inward facing surface 132 is operatively arranged to engage radially outward facing surface 152 (i.e., groove 134 engages end 144 of connector body 140) to connect spacer 120 to connector body 140. Radially inward facing surface 132 is connected to radially inward facing surface 128 via axial surface 129, which is arranged to abut against end 144 when spacer 120 is fully connected to connector body 140 (see FIG. 11). Surface 129 separates groove 134 and radially inward facing surface 128.

Section 120A, 120B further comprises male connector 136 and female connector 138. As shown, male connector 136 on section 120A is arranged to engage female connector 138 on section 120B, and male connector 136 on section 120B is arranged to engage female connector 138 on section 120A such that sections 120A and 120B are fixedly secured. In some embodiments, male connector 136 comprises radially extending projection 136A. Projection 136A extends generally radially inward in radial direction RD2. In some embodiments, male connector 136, specifically projection 136A, extends from radial surface 123 and is arranged parallel to a tangential surface of radially inward facing surface 128. Male connector 136 further comprises a plurality of teeth 136B. In some embodiments, teeth 136B extend radially outward in radial direction RD1 from a radially outward facing surface of section 120A, 120B. In some embodiments, teeth 136B extend radially inward in radial direction RD2. In some embodiments, projection 136A is flexible, elastic, or semi-elastic to allow male connector 136 and female connector 138 to be disengaged, as will be described in greater detail below.

In some embodiments, female connector 138 comprises projection 138A and projection 138B. Projection 138B is arranged tangent to radially inward facing surface 128. In some embodiments, projection 138B is not arranged tangent to radially inward facing surface 128. Projection 138A is arranged parallel to and spaced apart from protrusion 138B, forming slot or space 138C radially therebetween. In some embodiments, projection 138A is arranged non-parallel to projection 138B. Female connector 138 further comprises a plurality of teeth 138D arranged within slot 138C. In some embodiments, teeth 138D extend radially inward in radial direction RD2 from projection 138A and are operatively arranged to engage teeth 136B to lock sections 120A and 120B together. In some embodiments, teeth 138D extend radially outward in radial direction RD1 from projection 138B. In some embodiments, teeth 138D are arranged outside of slot 138C. In some embodiments, projection 138A and/or projection 138B are flexible, elastic, or semi-elastic to allow male connector 136 and female connector 138 to be disengaged, as will be described in greater detail below.

To connect section 120A and section 120B, male connector 136 is displaced toward female connector 138. As male connector 136 engages female connector 138, teeth 136B engage teeth 138D. The user may engage as many of teeth 136B and teeth 138D as is necessary to connect spacer 120 to connector body 140. This feature, namely, the ratchet teeth of male connector 136 and female connector 138, allow spacer 120 to be adjustable depending on the size of connector body 140 and tube 180 (i.e., diameters). Thus, for example, for a connector body 140 having a larger overall outer diameter, only one or two of teeth 136B and 138D are engaged. For a connector body 140 having a smaller overall diameter, more of teeth 136B and 138D will be engaged. When section 120A is secured to section 120B, projection 136A is engaged with slot 138C and projection 138B is arranged proximate to or abuts against surface 123. To disconnect section 120A and section 120B, at least one of projection 136A and projection 138B is displaced to disengage teeth 136B and teeth 138D. For example, projection 138A is displaced radially outward in radial direction RD1, which disengages teeth 138D from teeth 136B. In some embodiments, a tool such as a flat head screwdriver can be used to displace projection 138A and disconnect sections 120A and 120B.

Connector body 140 comprises through-bore 141 extending from end 142 to end 144, radially inward facing surface 146, radially inward facing surface 148, groove 150, groove 166, radially outward facing surface 152, groove 154, head 158, and radially outward facing surface 160. Connector body 140 is arranged to be connected to a component that is filled with a fluid or through which fluid flows. For example, connector body 140 may be connected to a refrigeration compressor or a transmission via radially outward facing surface 160, which may comprise external threading. Connector body 140 may be screwed into a threaded hole in the compressor via head 158 (e.g., using a wrench), which is then filled with refrigerant fluid. In some embodiments, head 158 is hexagonal; however, it should be appreciated that head 158 may comprise any geometry suitable for applying torque to connector body 140. Another component in which fluid connector 110, specifically connector body 140, may be installed into is a condenser, evaporator, or pump. It should be appreciated that fluid connector 110 may be used in various other components, assemblies, and subassemblies in which fluid connection is desired. Radially outward facing surface 160 may further comprise groove 156. A seal or O-ring is arranged in groove 156 to create a fluid tight seal between connector body 140 and the component it is connected to.

Seal 162 is arranged in connector body 140. Specifically, seal 162 is arranged in groove 150. Groove 150 is arranged in radially inward facing surface 148. In some embodiments, seal 162 is an O-ring. Canted coil 164 is arranged in connector body 140. Specifically, canted coil 164 is arranged in groove 166. Groove 166 is arranged in radially inward facing surface 146. In some embodiments, connector body 140 further comprises surface 147 that connects generally cylindrical radially inward facing surface 148 with generally cylindrical radially inward facing surface 146. In some embodiments, surface 147 is a frusto-conical surface. In some embodiments, surface 147 is an axial surface facing in axial direction AD2. Surface 147 is operatively arranged to engage surface 184A when disengaging or unlocking fluid connection assembly 110, as will be described in greater detail below. Radially inward facing surface 148 comprises a first diameter and radially inward facing surface 146 comprises a second diameter, the second diameter being greater than the first diameter. Radially inward facing surface 146 is connected to end 144.

Groove 154 is arranged in radially outward facing surface 152. Groove 154 is arranged axially between end 144 and head 158. In some embodiments, groove 154 is arranged immediately adjacent to head 158. Groove 154 is operatively arranged to engage with flange 130 to connect spacer 120 to connector body 140. In some embodiments, connector body 140 comprises a metal. In some embodiments, connector body 140 comprises a polymer. In some embodiments, connector body 140 comprises a ceramic.

To assemble fluid connection assembly 110, spacer 120 is secured over or onto connector body 140. Specifically, section 120A is arranged over connector body 140 such that flanges 130 engage groove 154, radially inward facing surface 132 engages radially outward facing surface 152, and surface 129 engages end 124. Once section 120A is properly positioned, section 120B is positioned in the same way and is "snapped" into section 120B. By snapped it is meant that male connector 136 of section 120B is engaged with female connector 138 of section 120A, and female connector 138 of section 120B is engaged with male connector 136 of section 120A, or vice versa. This may occur sequentially or simultaneously. This connection method creates a snapping or ratcheting effect between teeth 136B and teeth 138D that ultimately axially secures retainer 120 to connector body 140. Tube 180 is then inserted in axial direction AD1, with end 182 first, into spacer 120 and connector body 140. Radially outward facing surface 184 passes by canted coil 164 without any detrimental contact (i.e., engagement that may result in canted coil 164 scratching radially outward facing surface 184) and engages seal 162, and section 183 is arranged inside of connector body 140 proximate radially inward facing surface 148. Shoulder 187 is spaced apart from end 144 such that surface 186 abuts against end 124 and canted coil 164 is engaged with groove 185A.

As tube 180 is inserted in axial direction AD1 within connector body 140, radially outward facing surface 185 engages canted coil 164 thereby "charging" or rotating it about a center axis of the coil. When groove 185A finally aligns with groove 166, canted coil 164 is charged or exhibits a wound state and is ovular such that canted coil 164 prevents tube 180 from being displaced in axial direction AD2 with respect to connector body 140. While the now charged canted coil 164 prevents displacement of tube 180 in axial direction AD2 with respect to connector body 140, spacer 120 prevents displacement of tube 180 in axial direction AD1 with respect to connector body 140 and fluid connection assembly 110 is in the locked state. In addition, in the locked state radially inward facing surface 128 engages tube 180, specifically radially outward facing surface 185, which further prevents displacement of tube 180 in radial directions RD1 and RD2 relative to connector body 140.

To disengage or unlock fluid connection assembly 110, spacer 120 is first removed from connector body 140. As previously described, female connector 138 is disengaged from male connector 136, for example, by displacing projection 138A radially outward in radial direction RD1 relative to projection 136A, which disengages teeth 138D from teeth 136B. Sections 120A and 120B can then be separated. Tube 180 is then displaced in axial direction AD1 with respect to connector body 140 until surface 186 engages or abuts against end 144 of connector body 140. At this point, groove 185B is aligned with groove 166 and engaged with canted coil 164, and surface 184A is arranged proximate to or abuts against surface 147. Because groove 185B comprises a greater depth than groove 185A, groove 185B, when aligned with groove 166, allows canted coil 164 to unwind or un-charge (i.e., release its tension). Once the tension in canted coil 164 is released, tube 180 can then be removed from connector body 140 (i.e., displaced in axial direction AD2 with respect to connector body 140).

It should be appreciated that the components of fluid connection assembly 10 and fluid connection assembly 110 can be used interchangeably with each other and/or modified to be used interchangeably with each other.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Spacer
20A Section
20B Section
21 Hole
22 End
23 Surface
24 End
26 Radially outward facing surface
28 Radially inward facing surface
29 Surface
30 Flange
32 Radially inward facing surface
34 Groove
36 Male connector
36A Projection
36B Teeth
38 Female connector
38A Projection
38B Projection
38C Slot or space
38D Teeth
40 Connector body
41 Through-bore
42 End
44 End
46 Radially inward facing surface
48 Radially inward facing surface
50 Groove
52 Radially outward facing surface
54 Groove
56 Groove
58 Head
60 Radially outward facing surface
62 Seal
64 Canted coil
66 Groove
80 Tube
82 End
83 Section
84 Radially outward facing surface
85A Groove
85B Groove
86 Surface
87 Shoulder or bead
88 Surface
89 Section
90 Radially outward facing surface
92 End
94 Through-bore
110 Fluid connection assembly
120 Spacer
120A Section
120B Section
121 Hole
122 End
123 Surface
124 End
126 Radially outward facing surface
128 Radially inward facing surface
129 Surface
130 Flange or flanges
132 Radially inward facing surface
134 Groove
136 Male connector
136A Projection
136B Teeth
138 Female connector
138A Projection
138B Projection
138C Slot or space
138D Teeth
140 Connector body
141 Through-bore
142 End
144 End
146 Radially inward facing surface
147 Surface 148 Radially inward facing surface
150 Groove
152 Radially outward facing surface
154 Groove
156 Groove
158 Head
160 Radially outward facing surface
162 Seal
164 Canted coil
166 Groove
180 Tube
182 End
183 Section
184 Radially outward facing surface
184A Radially outward facing surface
185 Radially outward facing surface
185A Groove
185B Groove
186 Surface
187 Shoulder or bead
188 Surface
189 Section
190 Radially outward facing surface
192 End
194 Through-bore
AD1 Axial direction
AD2 Axial direction
RD1 Radial direction
RD2 Radial direction

What is claimed is:

1. A fluid connection assembly, comprising:
a connector body, including:
a first end;
a second end;
a first through-bore;
a canted coil arranged in the first through-bore; and
a first radially outward facing surface comprising a first groove; and
a spacer operatively arranged to be removably connected to the connector body, the spacer including:
a first section, including:
a third end engaged with the first groove;
a fourth end;
a first axial surface arranged between the third end and the fourth end;
a first male connector; and
a first female connector; and
a second section, including:
a fifth end engaged with the first groove;
a sixth end;
a second axial surface arranged between the fifth end and the sixth end;
a second male connector arranged to engage with the first female connector; and
a second female connector arranged to engage with the first male connector;
wherein, in a locked state the first axial surface and the second axial surface abut against the second end.

2. The fluid connection assembly as recited in claim 1, wherein the first section further comprises a first flange extending radially inward at the third end, the first flange arranged to engage the first groove.

3. The fluid connection assembly as recited in claim 1, further comprising a tube including a shoulder, wherein in the locked state the shoulder abuts against the spacer.

4. The fluid connection assembly as recited in claim 3, wherein the tube further comprises a second groove and a third groove spaced apart from the second groove, wherein in the locked state the canted coil is engaged with the second groove.

5. The fluid connection assembly as recited in claim 4, wherein a depth of the third groove is greater than a depth of the second groove.

6. The fluid connection assembly as recited in claim 1, wherein:
the first section comprises a first plurality of teeth; and
the second section comprises a second plurality of teeth operatively arranged to engage the first plurality of teeth to lock the second section to the first section.

7. The fluid connection assembly as recited in claim 6, wherein:
the first plurality of teeth are arranged on the first male connector; and
the second plurality of teeth are arranged on the second female connector.

8. The fluid connection assembly as recited in claim 1, wherein the first male connector comprises:
a first projection; and
a first plurality of teeth arranged on the first projection and extending in a first radial direction.

9. The fluid connection assembly as recited in claim 8, wherein the second female connector comprises:
a second projection; and
a second plurality of teeth arranged on the second projection and extending in a second radial direction, opposite the first radial direction, the second plurality of teeth operatively arranged to engage the first plurality of teeth to lock the second section with the first section.

10. The fluid connection assembly as recited in claim 9, wherein the second female connector further comprises a third projection spaced apart from the second projection.

11. The fluid connection assembly as recited in claim 10, wherein:
a slot is formed between the second projection and the third projection; and
the first projection is operatively arranged to engage the slot.

12. A fluid connection assembly, comprising:
a connector body, including:
a first end;
a second end;
a first through-bore;
a canted coil arranged in the first through-bore; and
a first radially outward facing surface comprising a first groove; and
a spacer operatively arranged to be removably connected to the connector body, the spacer including:
a first section, including:
a third end engaged with the first groove;
a fourth end;
a first axial surface arranged between the third end and the fourth end; and
a male connector comprising a first plurality of teeth extending in a first radial direction; and
a second section, including:
a fifth end engaged with the first groove;
a sixth end;
a second axial surface arranged between the fifth end and the sixth end; and
a female connector comprising a second plurality of teeth extending in a second radial direction, opposite the first radial direction, the second plurality of teeth operatively arranged to engage the first plurality of teeth.

13. The fluid connection assembly as recited in claim 12, wherein the first section further comprises at least one flange extending radially inward at the third end, the at least one flange arranged to engage the first groove.

14. The fluid connection assembly as recited in claim 12, further comprising a tube including a shoulder, a second groove, and a third groove spaced apart from the second groove, wherein in the locked state the shoulder abuts against the spacer and the canted coil is engaged with the second groove.

15. The fluid connection assembly as recited in claim 12, wherein the first section comprises:
   a first radially inward facing surface including a first diameter and forming the third end; and
   a second radially inward facing surface including a second diameter and forming the fourth end, the second diameter being less than the first diameter.

16. The fluid connection assembly as recited in claim 12, wherein the male connector comprises:
   a first projection; and
   the first plurality of teeth are arranged on the first projection.

17. The fluid connection assembly as recited in claim 16, wherein the female connector comprises:
   a second projection; and
   the second plurality of teeth are arranged on the second projection, wherein engagement of the second plurality of teeth with the first plurality of teeth lock the second section to the first section.

18. The fluid connection assembly as recited in claim 17, wherein female connector further comprises a third projection spaced apart from the second projection.

19. The fluid connection assembly as recited in claim 18, wherein:
   a slot is formed between the second projection and the third projection; and
   the first projection is operatively arranged to engage the slot.

20. A fluid connection assembly, comprising:
   a connector body, including:
      a first end;
      a second end;
      a through-bore;
      a canted coil arranged in the through-bore; and
      a radially outward facing surface comprising a first groove;
   a spacer operatively arranged to be removably connected to the connector body, the spacer including:
      a first section, including:
         a third end engaged with the first groove;
         a fourth end;
         a first axial surface arranged between the third end and the fourth end; and
         a male connector comprising a first plurality of teeth extending in a first radial direction; and
      a second section, including:
         a fifth end engaged with the first groove;
         a sixth end;
         a second axial surface arranged between the fifth end and the sixth end; and
         a female connector comprising a second plurality of teeth extending in a second radial direction, opposite the first radial direction, the second plurality of teeth operatively arranged to engage the first plurality of teeth; and
   a tube including a shoulder, a second groove, and a third groove spaced apart from the second groove;
   wherein in the locked state the shoulder abuts against the spacer and the canted coil is engaged with the second groove.

* * * * *